US012286083B2

(12) United States Patent
McIntosh

(10) Patent No.: US 12,286,083 B2
(45) Date of Patent: Apr. 29, 2025

(54) SYSTEMS AND METHODS FOR CLEANING A FLOOR OF A LAVATORY WITHIN AN INTERNAL CABIN OF A VEHICLE

(71) Applicant: THE BOEING COMPANY, Chicago, IL (US)

(72) Inventor: Darren Carl McIntosh, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 300 days.

(21) Appl. No.: 17/974,684

(22) Filed: Oct. 27, 2022

(65) Prior Publication Data

US 2024/0140369 A1  May 2, 2024

(51) Int. Cl.
*B60S 1/64* (2006.01)
*B08B 5/02* (2006.01)
*B08B 5/04* (2006.01)

(52) U.S. Cl.
CPC .... *B60S 1/64* (2013.01); *B08B 5/02* (2013.01); *B08B 5/04* (2013.01)

(58) Field of Classification Search
CPC ..... B60S 1/64; B08B 5/02; B08B 5/04; A47L 5/14; A47L 7/0047; B60N 3/04; B60N 3/048
USPC .................................................. 15/345, 346
See application file for complete search history.

(56) References Cited

U.S. PATENT DOCUMENTS

| 10,065,740 | B2 | 9/2018 | Childress | |
|---|---|---|---|---|
| 10,982,439 | B2 | 4/2021 | Childress | |
| 2017/0283062 | A1* | 10/2017 | Childress | B08B 5/04 |
| 2017/0284076 | A1* | 10/2017 | Jensen | E03D 9/002 |

FOREIGN PATENT DOCUMENTS

| CN | 107487248 A | * | 12/2017 | ............... B60N 3/04 |
|---|---|---|---|---|
| CN | 113635865 A | * | 11/2021 | |
| JP | 2002172968 A | * | 6/2002 | |
| KR | 20070067841 A | * | 6/2007 | |
| WO | WO-2013147502 A1 | * | 10/2013 | ............. A47L 23/22 |

* cited by examiner

*Primary Examiner* — C. A. Rivera
(74) *Attorney, Agent, or Firm* — Joseph M. Butscher; The Small Patent Law Group LLC

(57) ABSTRACT

A vehicle includes an internal cabin, a lavatory within the internal cabin, and a cleaning system within the lavatory. The cleaning system includes a floor having an exposed upper surface. The floor includes a hydrophobic material configured to repel liquid. An air knife is configured to output an airstream over the exposed upper surface of the floor to remove one or both of liquid or debris off the floor. The air knife is at or proximate to a first portion of the floor. A vacuum has an air inlet. The vacuum draws in the airstream through the air inlet. The vacuum is at or proximate to a second portion of the floor that is opposite from the first portion. The first portion is at a first level that is above a second level of the second portion.

20 Claims, 5 Drawing Sheets

SYSTEMS AND METHODS FOR CLEANING A FLOOR OF A LAVATORY WITHIN AN INTERNAL CABIN OF A VEHICLE

FIELD OF THE DISCLOSURE

Examples of the present disclosure generally relate to systems and methods for cleaning a floor of a lavatory within an internal cabin of a vehicle, such as a commercial aircraft.

BACKGROUND OF THE DISCLOSURE

Commercial aircraft are used to transport passengers between various locations. During a flight—particularly a trans-oceanic or other long haul flight—passengers are typically confined within certain areas of an aircraft. Various individuals (such as passengers, pilots, flight attendants, and the like) use certain internal portions of an aircraft during a flight. For example, numerous individuals may use a lavatory within an internal cabin during a flight.

As can be appreciated, with each use, the cleanliness of a lavatory onboard an aircraft may be compromised. Individuals onboard may be sensitive to health risks presented by a frequently-used lavatory onboard an aircraft. Indeed, as individuals use a lavatory onboard an aircraft, the likelihood of germs and bacteria therein increases.

An aircraft lavatory is generally cleaned between flights. For example, maintenance or cleaning personnel board the aircraft on the ground before and/or after a flight to clean the lavatory. However, during a flight, the lavatory is typically not cleaned, despite the fact that numerous individuals may use the lavatory during the flight. While flight attendants may be able to clean the lavatory, they are usually preoccupied with other duties during the flight. As such, cleaning the lavatory may not be a top priority for flight attendants during a flight or even between flights, and/or may include a brief, less thorough cleaning (such as only countertops being wiped). As such, the floor, for example, may be overlooked.

With repeated use, portions of the floor of the lavatory may be covered with liquids. Even after being cleaned, the floor of the lavatory may be wet from cleaning fluids. A wet lavatory floor may be unsettling to individuals, even if they know the floor is clean. That is, a wet floor may give the impression or perception of unsanitary conditions. Further, a wet floor may pose a safety hazard in that an individual may slip and fall on the wet floor.

Accordingly, dry floor assemblies have been developed. Examples of such dry floor assemblies include U.S. Pat. No. 10,065,740, entitled "Systems and Methods for Cleaning a Lavatory Floor," and U.S. Pat. No. 10,982,439, entitled "Dry Floor Liquid Disposal System." However, the dry floor assemblies can be complex. Further, manufacturing processes for such assemblies can be time and labor intensive.

SUMMARY OF THE DISCLOSURE

A need exists for an effective and efficient system and method for cleaning a floor of a lavatory, such as within an internal cabin of a vehicle.

With those needs in mind, certain examples of the present disclosure provide a cleaning system for an enclosed space. The cleaning system includes a floor having an exposed upper surface, and an air knife configured to output an airstream over the exposed upper surface of the floor to remove one or both of liquid or debris off the floor.

In at least one example, the floor includes a hydrophobic material configured to repel liquid. In at least one example, the floor is formed of the hydrophobic material. For example, the exposed upper surface is formed of the hydrophobic material.

In at least one example, the cleaning system also includes a vacuum having an air inlet. The vacuum is configured to draw in the airstream through the air inlet. In at least one example, the air knife is at or proximate to a first portion of the floor, and the vacuum is at or proximate to a second portion of the floor that is opposite from the first portion.

In at least one example, the floor has a gradient, and the air knife is at a highest level of the floor.

The cleaning system can also include a heater configured to heat the airstream.

The cleaning system can also include a control unit in communication with the air knife. The control unit is configured to control operation of the air knife.

In at least one example, the air knife continually outputs the airstream when the enclosed space is occupied and unoccupied. In at least one other example, the air knife outputs the airstream only when the enclosed space is unoccupied.

Certain examples of the present disclosure provide a cleaning method for an enclosed space. The cleaning method includes outputting, by an air knife, an airstream over an exposed upper surface of a floor; and removing, by the airstream, one or both of liquid or debris off the floor.

Certain examples of the present disclosure provide a vehicle including an internal cabin, a lavatory within the internal cabin, and a cleaning system within the lavatory, as described herein.

DETAILED DESCRIPTION OF THE DISCLOSURE

Figure 1:
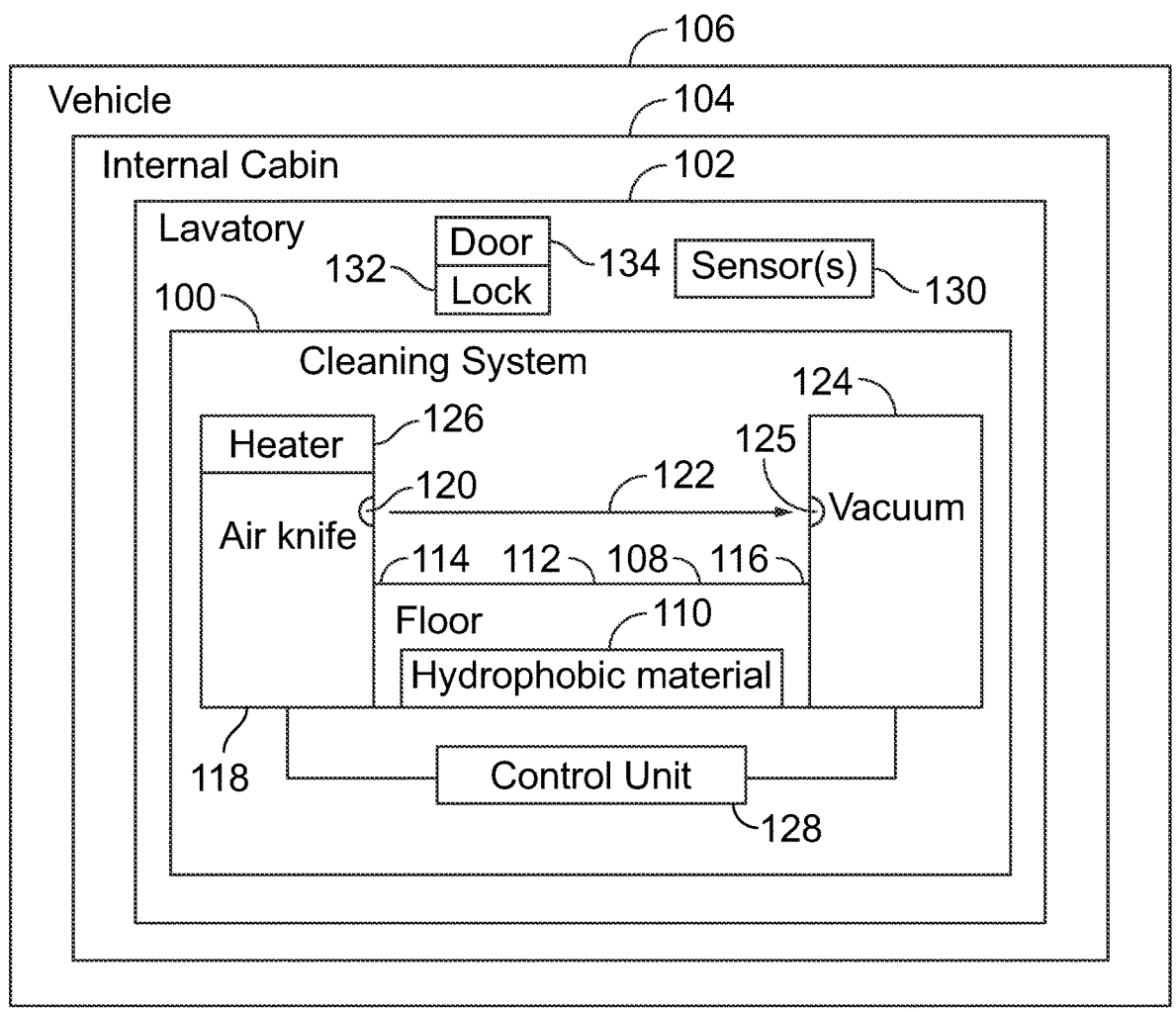
FIG. 1 illustrates a schematic block diagram of a cleaning system for a lavatory within an internal cabin of a vehicle, according to an example of the present disclosure.

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Examples of the present disclosure provide systems and methods for cleaning a floor, such as within a lavatory of an internal cabin of a vehicle. The systems and methods are configured to remove liquids from floor. In at least one example, the floor is formed of or coated with a hydrophobic material. As such, the systems and methods can include a synthetic hydrophobic floor surface, which causes liquid droplets to gather and bead, and be efficiently conveyed across the floor surface.

The systems and methods also include an air knife that is configured to output an airstream over an exposed upper surface of the floor. The airstream removes liquid and/or debris from the floor. In particular, liquid that beads on the exposed upper surface of the floor due to the hydrophobic material is efficiently and effectively conveyed off of the floor. In at least one example, a vacuum is at an opposite portion of the floor in relation to the air knife, and draws in the airstream, including conveyed liquid and/or debris. In at least one example, the air knife emits the airstream as an amplified stream of laminar airflow.

In at least one example, the floor has a gradient. For example, the air knife is disposed at or proximate to a first portion (such as a first end or first side) of the floor, and the vacuum is disposed at or proximate to a second portion (such as a second end or second side) of the floor, opposite from the air knife. The floor is graded such that an outlet of the air knife is at a higher level than an inlet of the vacuum. The gradient of the floor allows the liquid and/or debris to slide over the upper exposed upper surface of the floor from a higher level to a lower level, with the inlet of the vacuum being at the lowest level of the floor.

In at least one example, the air knife may continually output the airstream to remove liquid and debris from the floor, whether or not an enclosed space, such as the lavatory, is occupied or unoccupied. As another example, the air knife can be selectively activated and deactivated in intervals. For example, the air knife can be activated to output the airstream when the lavatory is unoccupied.

In at least one example, a heater can be used to heat the airstream before, during, or after being emitted from the air knife. The heated airstream increases a rate of evaporation of liquids on the floor.

Certain examples of the present disclosure provide a lavatory clean floor system that removes liquids and/or debris from a lavatory floor. The system includes a synthetic hydrophobic floor surface, which causes liquid droplets to gather and bead therein. The floor can have a gradient, which promotes downward motion of liquid droplets to move downwards toward a desired location. An air knife generates a positive airflow over an exposed upper surface of the floor. The airflow can be a laminar flow of air that quickly propels liquid droplets to a desired location. The airflow can be heated, to increase a rate of evaporation of the liquids. A vacuum is directly opposed to the air knife and generated negative airflow, thereby drawing in the airflow from the air knife and any liquid and debris conveyed therein. The liquid and debris can be extracted from the airflow and deposited into a toilet waste drain that is in fluid communication with the vacuum.

FIG. 1 illustrates a schematic block diagram of a cleaning system 100 for a lavatory 102 within an internal cabin 104 of a vehicle 106, according to an example of the present disclosure. The lavatory 102 is an example of an enclosed space. The vehicle 106 can be a commercial aircraft. As another example, the vehicle 106 can be a land-based vehicle, such as a bus, van, train car, or the like. As another example, the vehicle 106 can be a watercraft, such as a cruise ship or cargo ship. As another example, the vehicle 106 can be a spacecraft. Optionally, the cleaning system 100 can be used with respect to enclosed spaces of fixed structures, such as residential or commercial buildings, public restrooms or lavatories, and/or the like.

The cleaning system 100 includes a floor 108 including a hydrophobic material 110. In at least one example, the floor 108 is formed of the hydrophobic material 110. In at least one other example, the floor 108 is coated with the hydrophobic material 110. For example, an exposed upper surface 112 of the floor 108 can be coated with the hydrophobic material 110. The hydrophobic material 110 has a low surface energy such that liquids do not wet or bond to the hydrophobic material 110. In at least one example, the hydrophobic material 110 includes non-polar molecules that repel bodies of water. Examples of the hydrophobic material 110 include alkanes, oils, fats, and/or the like. The hydrophobic material can be a superhydrophobic or an ultra-hydrophobic material. Alternatively, the floor 108 does not include a hydrophobic material.

In at least one example, the exposed upper surface 112 has a gradient. That is, the exposed upper surface 112 is not level in relation to the internal cabin 104. Instead, the exposed upper surface 112 is angled in relation to the internal cabin 104, and is not parallel to the floor of the passenger seating area. As an example, a first portion 114 (such as a first end or first side) of the floor 108 is at a first level that is above a second level of a second portion 116 (such as a second end or second side) that is opposite from the first portion 114. As such, liquids on the exposed upper surface 112 slide away from the first portion 114 and toward the second portion 116. The gradient of the exposed upper surface 112 can be uniform. For example, a slope of the exposed upper surface 112 from the first portion 114 to the second portion 116 can be uniform.

Alternatively, the exposed upper surface 112 of the floor 108 can be level in relation to the internal cabin 104. For example, the exposed upper surface 112 can be parallel to a floor of a passenger seating area within the internal cabin 104. In such an example, the first portion 114 and the second portion 116 are at the same level.

The cleaning system 100 also includes an air knife 118 at or proximate to (such as abutting) the first portion 114 of the floor 108. The air knife 118 includes an air outlet 120 at and/or above a level of the exposed upper surface 112 of the floor 108. The air knife 118 generates and outputs an airstream 122 over the exposed upper surface 112.

In at least one example, the airstream 122 is a laminar flow of air. The air knife 118 blows compressed air over the exposed upper surface 112 to remove liquids and debris therefrom. In at least one example, the air knife 118 draws in compressed air at an inlet, such as at one or more ports. The compressed air flows into a plenum chamber. Surrounding air is entrained by the airflow, thereby producing an amplification ratio, such as a ratio of 40:1 at a six inch distance, adhering to the Coanda effect. The airflow then travels out of the air outlet 120 as an amplified airstream of laminar flow with reduced wind shear.

The hydrophobic material 110 and the gradient of the floor 108 increase the rate at which the conveyed liquids and/or debris are removed within the airstream 122. That is, the downward angle of the exposed upper surface 112 and the low friction of the hydrophobic material 110 allow the liquids and debris to readily and easily slide over the exposed upper surface 112 as they are conveyed toward the second portion 116 by the airstream 122.

In at least one example a vacuum 124 is at or proximate to (such as abutting) the second portion 116 of the floor 108, opposite from the air knife 118. The vacuum 124 includes an air inlet 125 at and/or above the level of the exposed upper surface 112 of the floor 108. The vacuum 124 generates negative air pressure that draws in the airstream 122 generated by the air knife 118 and any liquids and/or debris conveyed within the airstream 122. The vacuum 124 can be in fluid communication with a waste drain, such as a toilet waste drain. As such, liquids and/or debris drawn in by the vacuum 124 are deposited into the waste drain. Alternatively, the cleaning system 100 does not include the vacuum 124.

In at least one example, the cleaning system 100 also includes a heater 126. The heater 126 can be at or proximate to the first portion 114 of the floor 108. For example, the heater 126 can be or include one or more heating coils, heat exchangers, and/or the like that are configured to heat the airstream 122. In at least one example, the air knife 118 includes the heater 126. In at least one other example, the air knife 118 is separate and distinct from the air knife 118. The heater 126 is configured to heat the airstream 122 before passing through the air outlet 120. As another example, the heater 126 is configured to heat the airstream 122 after passing through the air outlet 120. The airstream 122, as heated, increases a rate of evaporation of liquids contacted by the airstream 122. As such, less liquid can be drawn in by the vacuum 124. Optionally, the cleaning system 100 does not include the heater 126.

In at least one example, a control unit 128 is in communication with the air knife 118, the vacuum 124, and/or the heater 126, such as via wired or wireless connections. The control unit 128 is configured to control operation of the air knife 118, the vacuum 124, and/or the heater 126. For example, the control unit 128 is configured to control activation and deactivation of the air knife 118, the vacuum 124, and/or the heater 126.

The control unit 128 can also be in communication with one or more sensors 130 and/or a lock 132 or a door 134 of an enclosed space (for example, the lavatory 102), such as via one or more wired or wireless connections. The sensor(s) 130 can be configured to detect an occupancy status of the lavatory 102. For example, the sensor(s) 130 can be or otherwise include a heat sensor, a motion sensor, an infrared sensor, an ultrasonic sensor, a pressure sensor (such as an electronic scale), a proximity sensor, and/or the like. In at least one example, the control unit 128 operates the air knife 118, the vacuum 124, and/or the heater 126 to remove liquid and debris from the floor 108 and into the vacuum 124 when the lavatory 102 is unoccupied, as determined through signal output by the one or more sensors 130.

In at least one other example, the control unit 128 can determine the occupancy status of the lavatory 102 through signals received from the lock 132. For example, the control unit 128 can be configured to determine the occupancy status of the lavatory 102 through a locking sequence of the lock 132. As an example, the control unit 128 can determine that the lavatory 102 is unoccupied in response to detecting signal output by the lock 132 indicating that the door 134 has been unlocked, opened, and then closed in an unlocked state.

As such, the control unit 128 can determine an occupancy status from the sensor(s) 130 and/or the lock 132. The control unit 128 can operate the air knife 118, the vacuum 124, and/or the heater 126 to remove liquid and debris off the floor 108 and into the vacuum 124 when the lavatory 102 is unoccupied. Alternatively, the cleaning system 100 can be operated even if the lavatory 102 is occupied. In at least one other example, the control unit 128 may not be in communication with the sensor(s) 130 and/or the lock 132. In at least one other example, the cleaning system 100 may not include the control unit 128. Instead, the air knife 118, the vacuum 124, and/or the heater 126 can be continually activated, and/or manually operated, such as via an actuation device, such as a foot pedal, lever arm, handle, push button, and/or the like.

In at least one example, the air knife 118 continually outputs the airstream 122 when the enclosed space (for example, the lavatory 102) is occupied and unoccupied. In at least one other example, the air knife 118 outputs the airstream 122 only when the enclosed space is unoccupied.

In operation, the hydrophobic material 110 of the floor 108 causes liquid to bead, thereby forming liquid droplets. The air knife 118 generates the airstream 122 over the exposed upper surface 112 of the floor 108 to convey liquids and/or debris off the floor and into the vacuum 124. The gradient of the floor allows the liquids and/or debris to slide over the exposed upper surface 112, such as by gravity, toward and into the vacuum 124. The heater 126 can be operated to increase a rate of evaporation of the liquids to decrease an amount of liquid received by the vacuum 124.

As used herein, the term "control unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control unit 128 may be or include one or more processors that are configured to control operation, as described herein.

The control unit 128 is configured to execute a set of instructions that are stored in one or more data storage units or elements (such as one or more memories), in order to process data. For example, the control unit 128 may include or be coupled to one or more memories. The data storage units may also store data or other information as desired or needed. The data storage units may be in the form of an information source or a physical memory element within a processing machine.

The set of instructions may include various commands that instruct the control unit 128 as a processing machine to perform specific operations such as the methods and processes of the various examples of the subject matter described herein. The set of instructions may be in the form of a software program. The software may be in various forms such as system software or application software. Further, the software may be in the form of a collection of separate programs, a program subset within a larger program, or a portion of a program. The software may also include modular programming in the form of object-oriented programming. The processing of input data by the processing machine may be in response to user commands, or in response to results of previous processing, or in response to a request made by another processing machine.

The diagrams of examples herein may illustrate one or more control or processing units, such as the control unit 128. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control unit 128 may represent processing circuitry such as one or more of a field programmable gate array (FPGA), application specific integrated circuit (ASIC), microprocessor(s), and/or the like. The circuits in various examples may be configured to execute one or more algorithms to perform functions described herein. The one or more algorithms may include aspects of examples disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Figure 2:
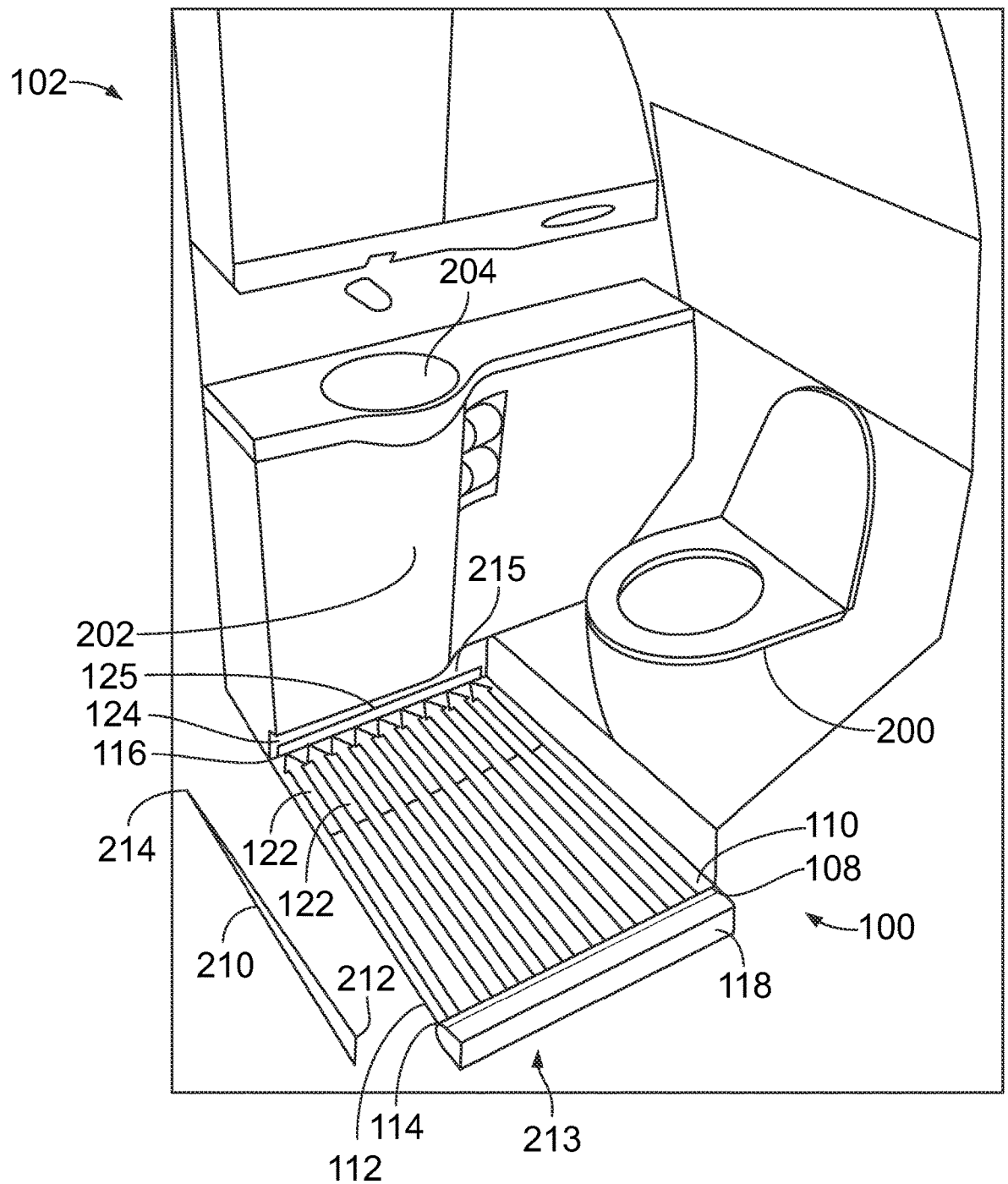
FIG. 2 illustrates a perspective internal view of a lavatory, according to an example of the present disclosure.

FIG. 2 illustrates a perspective internal view of a lavatory 102, according to an example of the present disclosure. The lavatory 102 may be onboard an aircraft, as described herein. Optionally, the lavatory 102 may be onboard various other vehicles. In other embodiments, the lavatory 102 may be within a fixed structure, such as a commercial or residential building, public restrooms or lavatories, and/or the like.

The lavatory 102 includes the floor 108 that supports a toilet 200, cabinets 202, and a sink 204. The floor 108 includes the hydrophobic material 110, which forms the exposed upper surface 112 (that is, the surface on which an individual can stand) of the floor 108.

The air knife 118 is at or proximate to a first portion 114, such as a first end or side, of the floor 108, while the vacuum is at or proximate to a second portion 116, which is opposite from the first portion 114. The floor 108 has a gradient 210 such that the first portion 114 is at a first level 212, and the second portion 116 is at a second level 214. The first level 212 is higher than the second level 214. As shown, the first level 212 can be the highest level of the floor 108. As such, liquids and/or debris on the exposed upper surface 112 are efficiently and effectively conveyed by the airstream 122 generated by the air knife 118. The rate of removal of the liquids and/or debris by the airstream 122 is increased by the hydrophobic material 110 and the gradient 210 of the floor 108.

As shown in FIG. 2, the airstream 122 moves from a location proximate to wall 213 toward a location underneath the cabinet 202, such as at a toe kick location 215. Optionally, the direction (and gradient) can be reversed.

Figure 3:
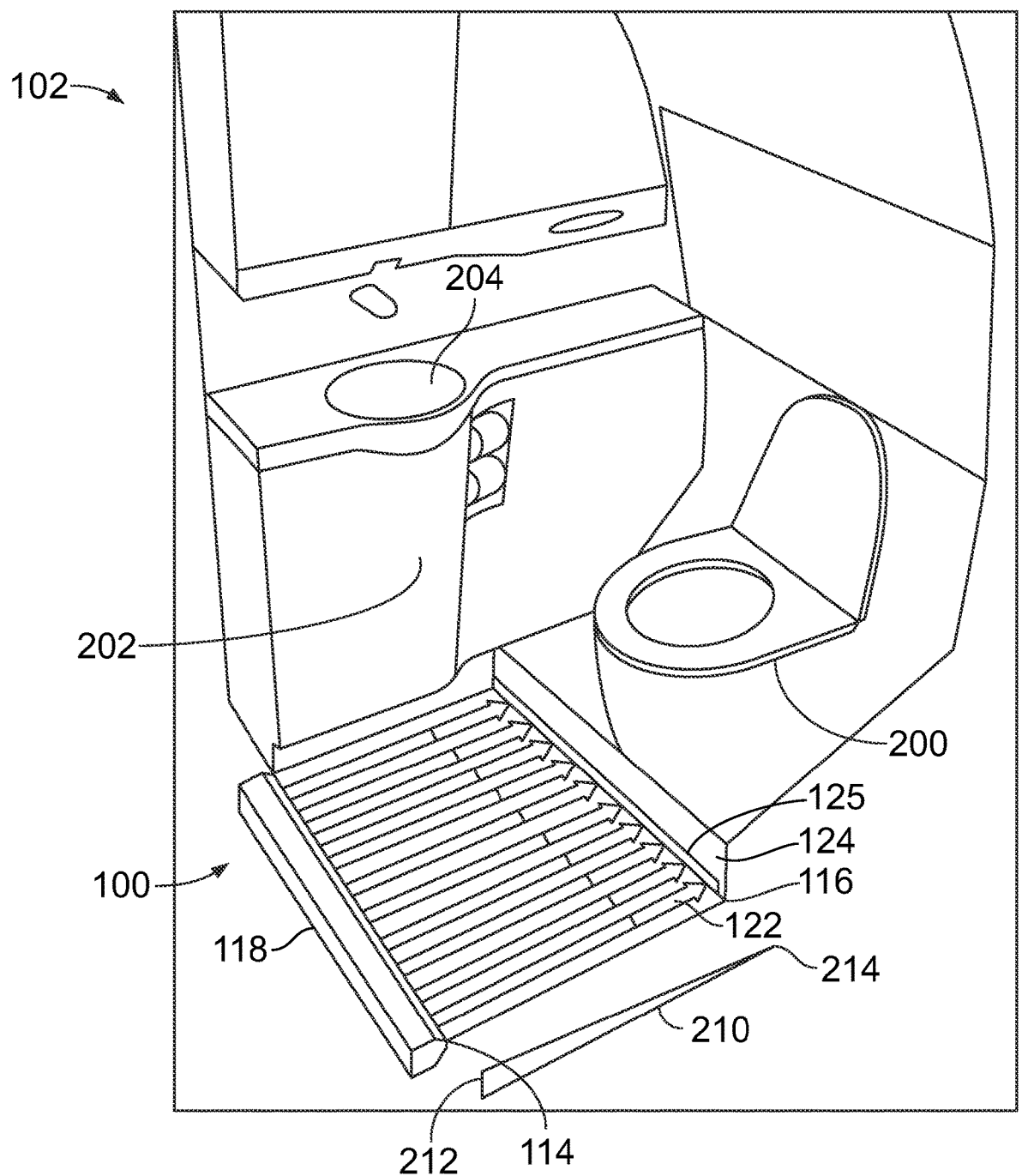
FIG. 3 illustrates a perspective internal view of a lavatory, according to an example of the present disclosure.

FIG. 3 illustrates a perspective internal view of a lavatory 102, according to an example of the present disclosure. The cleaning system 100 shown in FIG. 3 is similar to that of FIG. 2, except that the airstream 122 flows to the air inlet 125 of the vacuum 124 underneath the toilet 200.

Figure 4:
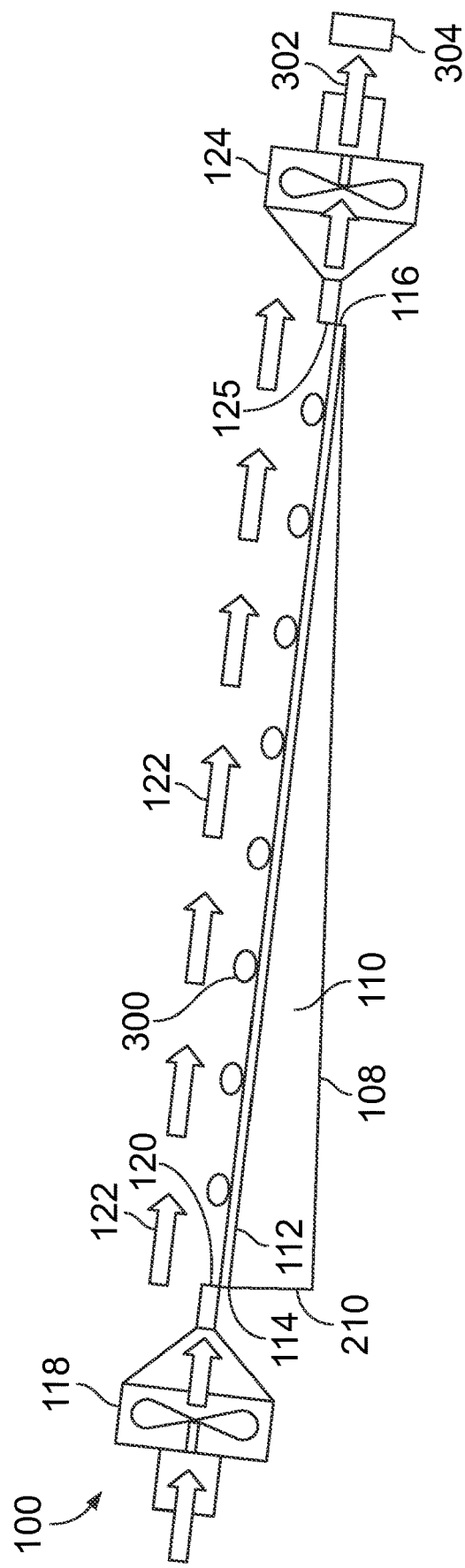
FIG. 4 illustrates a lateral view of an air knife outputting an airstream over an exposed upper surface of a floor, according to an example of the present disclosure.

FIG. 4 illustrates a lateral view of the air knife 118 outputting the airstream 122 over the exposed upper surface 112 of the floor 108, according to an example of the present disclosure. As shown, the exposed upper surface 112 has a gradient 210 that includes a constant downward slope from the first portion 114 to the second portion 116. The airstream 122, the hydrophobic material 110 of the floor 108, and the gradient 210 of the floor 108 cooperate to efficiently and effectively remove liquid droplets 300 from the floor 108. Removed material 302, such as liquid and/or debris, is extracted from the airflow and deposited into a waste drain 304, such as a toilet waste drain.

Optionally, the cleaning systems 100 described herein can be used in settings other than within lavatories. For example, the cleaning system 100 can be used in galleys, kitchens, swimming pool decks, patios, porches, public entryways (hotel lobbies, restaurants, bars, shopping centers, libraries, court house, etc.) and/or various other areas that can be susceptible to wet floors.

Figure 5:
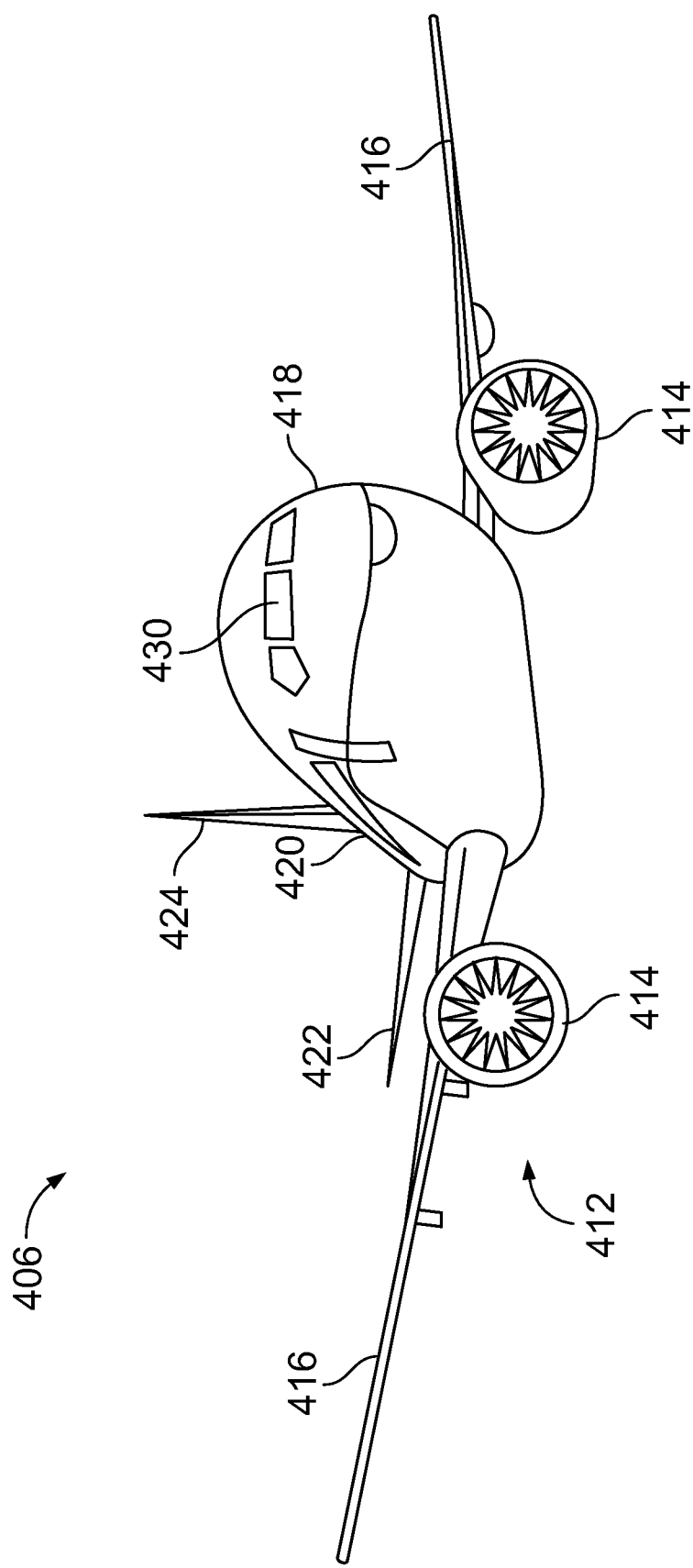
FIG. 5 illustrates a perspective front view of an aircraft, according to an example of the present disclosure.

FIG. 5 illustrates a perspective front view of an aircraft 406, according to an embodiment of the present disclosure. The aircraft 406 is an example of the vehicle 106 shown in FIG. 1. The aircraft 406 includes a propulsion system 412 that includes engines 414, for example. Optionally, the propulsion system 412 may include more engines 414 than shown. The engines 414 are carried by wings 416 of the aircraft 406. In other examples, the engines 414 may be carried by a fuselage 418 and/or an empennage 420. The empennage 420 may also support horizontal stabilizers 422 and a vertical stabilizer 424.

The fuselage 418 of the aircraft 406 defines an internal cabin 430, which includes a flight deck or cockpit, one or more work sections (for example, galleys, personnel carry-on baggage areas, and the like), one or more passenger sections (for example, first class, business class, and coach sections), one or more lavatories, and/or the like. The cleaning systems, as shown and described herein, can be used within the internal cabin 430, such as within an enclosed space (for example, a lavatory or galley) of the internal cabin 430.

Alternatively, instead of an aircraft, examples of the present disclosure may be used with various other vehicles, such as automobiles, buses, locomotives and train cars, watercraft, and the like. Further, examples of the present disclosure may be used with respect to fixed structures, such as commercial and residential buildings, public lavatories, or restrooms, and/or the like.

Further, the disclosure comprises examples according to the following clauses:

Clause 1. A cleaning system for an enclosed space, the cleaning system comprising:
- a floor having an exposed upper surface; and
- an air knife configured to output an airstream over the exposed upper surface of the floor to remove one or both of liquid or debris off the floor.

Clause 2. The cleaning system of Clause 1, wherein the floor includes a hydrophobic material configured to repel liquid.

Clause 3. The cleaning system of Clause 2, wherein the floor is formed of the hydrophobic material.

Clause 4. The cleaning system of Clauses 2 or 3, wherein the exposed upper surface is formed of the hydrophobic material.

Clause 5. The cleaning system of any of Clauses 1-4, further comprising a vacuum having an air inlet, wherein the vacuum is configured to draw in the airstream through the air inlet.

Clause 6. The cleaning system of Clause 5, wherein the air knife is at or proximate to a first portion of the floor, and wherein the vacuum is at or proximate to a second portion of the floor that is opposite from the first portion.

Clause 7. The cleaning system of any of Clauses 1-6, wherein the floor has a gradient, and wherein the air knife is at a highest level of the floor.

Clause 8. The cleaning system of any of Clauses 1-7, further comprising a heater configured to heat the airstream.

Clause 9. The cleaning system of any of Clauses 1-8, further comprising a control unit in communication with the air knife, wherein the control unit is configured to control operation of the air knife.

Clause 10. The cleaning system of any of Clauses 1-9, wherein the air knife continually outputs the airstream when the enclosed space is occupied and unoccupied.

Clause 11. The cleaning system of any of Clauses 1-10, wherein the air knife outputs the airstream only when the enclosed space is unoccupied.

Clause 12. A cleaning method for an enclosed space, the cleaning method comprising:
 outputting, by an air knife, an airstream over an exposed upper surface of a floor; and
 removing, by the airstream, one or both of liquid or debris off the floor.

Clause 13. The cleaning method of Clause 12, wherein the floor includes a hydrophobic material configured to repel liquid.

Clause 14. The cleaning method of Clauses 12 or 13, further comprising drawing in the airstream by a vacuum.

Clause 15. The cleaning method of Clause 14, wherein the air knife is at or proximate to a first portion of the floor, and wherein the vacuum is at or proximate to a second portion of the floor that is opposite from the first portion.

Clause 16. The cleaning method of any of Clauses 12-15, wherein the floor has a gradient, and wherein the air knife is at a highest level of the floor.

Clause 17. The cleaning method of any of Clauses 12-16, further comprising heating, by a heater, the airstream.

Clause 18. The cleaning method of any of Clauses 12-17, wherein said outputting occurs continually when the enclosed space is occupied and unoccupied.

Clause 19. The cleaning method of any of Clauses 12-18, wherein said outputting occurs only when the enclosed space is unoccupied.

Clause 20. A vehicle comprising:
 an internal cabin;
 a lavatory within the internal cabin; and
 a cleaning system within the lavatory, the cleaning system comprising:
  a floor having an exposed upper surface, wherein the floor includes a hydrophobic material configured to repel liquid;
  an air knife configured to output an airstream over the exposed upper surface of the floor to remove one or both of liquid or debris off the floor, wherein the air knife is at or proximate to a first portion of the floor;
  a heater configured to heat the airstream; and
  a vacuum having an air inlet, wherein the vacuum is configured to draw in the airstream through the air inlet, wherein the vacuum is at or proximate to a second portion of the floor that is opposite from the first portion, and wherein the first portion is at a first level that is above a second level of the second portion.

As described herein, examples of the present disclosure provide effective and efficient systems and methods for cleaning a floor of a lavatory, such as within an internal cabin of a vehicle.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the aspects of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A cleaning system for an enclosed space, the cleaning system comprising:
 a floor having an exposed upper surface; and
 an air knife configured to output an amplified airstream of laminar airflow over the exposed upper surface of the floor to remove one or both of liquid or debris off the floor, wherein the air knife comprises:
  one or more ports;
  a plenum chamber in fluid communication with the one or more ports; and
  an air outlet in fluid communication with the plenum chamber,
  wherein the air knife is configured to draw in compressed air through the one or more ports and entrain surrounding air, thereby producing an amplification ratio, and wherein the air knife outputs the amplified airstream of laminar airflow through the air outlet.

2. The cleaning system of claim 1, wherein the floor includes a hydrophobic material configured to repel liquid.

3. The cleaning system of claim 2, wherein the floor is formed of the hydrophobic material.

4. The cleaning system of claim 2, wherein the exposed upper surface is formed of the hydrophobic material.

5. The cleaning system of claim 1, further comprising a vacuum having an air inlet, wherein the vacuum is configured to draw in the amplified airstream of laminar airflow through the air inlet.

6. The cleaning system of claim 5, wherein the air knife is at or proximate to a first portion of the floor, and wherein the vacuum is at or proximate to a second portion of the floor that is opposite from the first portion.

7. The cleaning system of claim 1, wherein the floor has a uniform gradient, and wherein the air knife is at a highest level of the floor.

8. The cleaning system of claim 1, further comprising a heater configured to heat the amplified airstream of laminar airflow.

9. The cleaning system of claim 1, further comprising a control unit including one or more processors in communication with the air knife, wherein the control unit is configured to control operation of the air knife.

10. The cleaning system of claim 1, wherein the air knife continually outputs the amplified airstream of laminar airflow when the enclosed space is occupied and unoccupied.

11. The cleaning system of claim 1, wherein the air knife outputs the amplified airstream of laminar airflow only when the enclosed space is unoccupied.

12. A cleaning method for an enclosed space, the cleaning method comprising:
outputting, by an air knife, an amplified airstream of laminar airflow over an exposed upper surface of a floor, wherein the air knife comprises:
one or more ports;
a plenum chamber in fluid communication with the one or more ports; and
an air outlet in fluid communication with the plenum chamber,
wherein the air knife is configured to draw in compressed air through the one or more ports and entrain surrounding air, thereby producing an amplification ratio, and
wherein the air knife outputs the amplified airstream of laminar airflow through the air outlet; and
removing, by the amplified airstream of laminar airflow, one or both of liquid or debris off the floor.

13. The cleaning method of claim 12, wherein the floor includes a hydrophobic material configured to repel liquid.

14. The cleaning method of claim 12, further comprising drawing in the amplified airstream of laminar airflow by a vacuum.

15. The cleaning method of claim 14, wherein the air knife is at or proximate to a first portion of the floor, and wherein the vacuum is at or proximate to a second portion of the floor that is opposite from the first portion.

16. The cleaning method of claim 12, wherein the floor has a uniform gradient, and wherein the air knife is at a highest level of the floor.

17. The cleaning method of claim 12, further comprising heating, by a heater, the amplified airstream of laminar airflow.

18. The cleaning method of claim 12, wherein said outputting occurs continually when the enclosed space is occupied and unoccupied.

19. The cleaning method of claim 12, wherein said outputting occurs only when the enclosed space is unoccupied.

20. A vehicle comprising:
an internal cabin;
a lavatory within the internal cabin; and
a cleaning system within the lavatory, the cleaning system comprising:
a floor having an exposed upper surface, wherein the floor includes a hydrophobic material configured to repel liquid;
an air knife configured to output an amplified airstream of laminar airflow over the exposed upper surface of the floor to remove one or both of liquid or debris off the floor, wherein the air knife is at or proximate to a first portion of the floor, wherein the air knife comprises:
one or more ports;
a plenum chamber in fluid communication with the one or more ports; and
an air outlet in fluid communication with the plenum chamber,
wherein the air knife is configured to draw in compressed air through the one or more ports and entrain surrounding air, thereby producing an amplification ratio, and wherein the air knife outputs the amplified airstream of laminar airflow through the air outlet;
a heater configured to heat the amplified airstream of laminar airflow; and
a vacuum having an air inlet, wherein the vacuum is configured to draw in the amplified airstream of laminar airflow through the air inlet, wherein the vacuum is at or proximate to a second portion of the floor that is opposite from the first portion, and wherein the first portion is at a first level that is above a second level of the second portion.

* * * * *